(12) United States Patent
Garcia Perez

(10) Patent No.: US 11,415,111 B2
(45) Date of Patent: Aug. 16, 2022

(54) LIGHTNING PROTECTION SYSTEM FOR A WIND TURBINE AND WIND TURBINE COMPRISING SUCH A LIGHTNING PROTECTION SYSTEM

(71) Applicant: Siemens Gamesa Renewable Energy Innovation & Technology S.L., Sarriguren (ES)

(72) Inventor: Jose Manuel Garcia Perez, Vitoria-Gasteiz (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 82 days.

(21) Appl. No.: 16/806,294

(22) Filed: Mar. 2, 2020

(65) Prior Publication Data

US 2020/0291925 A1    Sep. 17, 2020

(30) Foreign Application Priority Data

Mar. 11, 2019  (EP) ..................................... 19380003

(51) Int. Cl.
*F03D 80/30*    (2016.01)
*F03D 1/06*    (2006.01)
(Continued)

(52) U.S. Cl.
CPC ........... *F03D 80/30* (2016.05); *F03D 1/0675* (2013.01); *H01R 39/381* (2013.01); *H01R 39/44* (2013.01)

(58) Field of Classification Search
CPC ......... F03D 80/30; H01R 39/40; H01R 39/44; H02G 13/00; H02G 13/40; H02G 13/80; Y10T 403/32549; Y10T 403/32991
(Continued)

(56) References Cited

U.S. PATENT DOCUMENTS 2,138,377 A * 11/1938 Hamlin ..................... B66F 7/04
182/152
3,206,999 A * 9/1965 Roth .................... H01H 9/0005
74/511 R
(Continued)

FOREIGN PATENT DOCUMENTS

EP        2336560 A1    6/2011
EP        2482407 A1    8/2012
(Continued)

OTHER PUBLICATIONS

Japanese Office Action dated Feb. 17, 2021 for Application No. 2020-041143.
(Continued)

*Primary Examiner* — Woody A Lee, Jr.
*Assistant Examiner* — Wesley Le Fisher
(74) *Attorney, Agent, or Firm* — Schmeiser, Olsen & Watts LLP

(57) ABSTRACT

Provided is a lightning protection system for a wind turbine, including a connection unit to be placed between a nacelle and at least one blade of the wind turbine for conducting lightning current and/or static energy from the at least one blade to the nacelle, the connection unit including a first end portion with at least one nacelle contacting element, a second end portion with at least one blade contacting element, at least one first support member supporting the at least one nacelle contacting element, at least one second support member supporting the at least one blade contacting element, a base portion located between the first support member and the second support member, and at least one shifting element mechanically connecting the first support member and/or the second support member slidably relative to the base portion for amending a length of the connection unit in an amending direction from the blade to the nacelle.

9 Claims, 2 Drawing Sheets

(51) Int. Cl.
*H01R 39/44* (2006.01)
*H01R 39/38* (2006.01)

(58) Field of Classification Search
USPC .......................................................... 191/40
See application file for complete search history.

(56) References Cited

U.S. PATENT DOCUMENTS

| | | | | |
|---|---|---|---|---|
| 4,064,590 | A * | 12/1977 | Smith | E05D 15/264 |
| | | | | 16/90 |
| 8,643,997 | B2 * | 2/2014 | Lyngby | F03D 80/30 |
| | | | | 361/117 |
| 10,519,937 | B2 * | 12/2019 | Nielsen | H01R 39/64 |
| 2009/0038819 | A1 * | 2/2009 | Molbech | H02G 13/80 |
| | | | | 174/2 |
| 2012/0162850 | A1 * | 6/2012 | Casazza | F03D 13/20 |
| | | | | 361/221 |
| 2012/0194962 | A1 * | 8/2012 | Yan | F03D 80/30 |
| | | | | 361/221 |
| 2013/0100570 | A1 * | 4/2013 | Lyngby | F03D 80/30 |
| | | | | 361/117 |
| 2017/0030336 | A1 * | 2/2017 | Arocena De La Rua | |
| | | | | H02K 7/1838 |

FOREIGN PATENT DOCUMENTS

| | | | |
|---|---|---|---|
| EP | 3124791 A1 | 2/2017 | |
| WO | WO 2013/084374 | 6/2013 | |
| WO | WO-2015086025 A1 * | 6/2015 | ............. F03D 80/30 |

OTHER PUBLICATIONS

European Search Report dated Sep. 11, 2019 for Application No. 19380003.4.

* cited by examiner

LIGHTNING PROTECTION SYSTEM FOR A WIND TURBINE AND WIND TURBINE COMPRISING SUCH A LIGHTNING PROTECTION SYSTEM

CROSS-REFERENCE TO RELATED APPLICATIONS

This application claims priority to European Application No. 19380003.4, having a filing date of Mar. 11, 2019, the entire contents of which are hereby incorporated by reference.

FIELD OF TECHNOLOGY

The following relates to a lightning protection system for a wind turbine as well as a wind turbine comprising such a lightning protection system.

BACKGROUND

Wind turbines are usually equipped with lightning protection systems to ensure that large currents induced by a strike of lightning can be conducted to ground without damaging the components of the wind turbine.

The blades of a wind turbine are particularly vulnerable to lightning strikes on account of their length. The lightning protection system of a wind turbine therefore generally includes a lightning conductor for each blade, arranged in the interior of the blade and extending along its length from tip to base. The blades are generally mounted to a blade mounting part in a hub or spinner, and the combined arrangement rotates relative to the stationary nacelle or a canopy. The rotating assembly is connected to the stationary nacelle by means of a bearing. To electrically connect the rotating hub and blade arrangement to the relatively stationary nacelle, each conductor of a blade terminates in a sliding brush that effects the electrical connection to the stationary conductive ring arranged in the hub and/or at the nacelle. The conductive ring in turn is electrically connected to ground, so that, in the event of a lightning strike to a receptor of a blade, the electrical current sees a direct path along the blade lightning conductor and across the brush over the nacelle to ground.

A problem with this kind of lightning protection system arises on account of the nature of the electrical system defined by the moving and stationary lightning conductors, the interface between them, the outside environment, and the environment inside the hub. In a specific example, the trim of a gutter ring cannot be built as precise as desired due to manufacturing and modular assembly. Hence, there is a gap of up to several centimeters between static parts of the nacelle and moving parts of the blade and blade bearing parts, respectively. Thus, there may occur an electric arc between the nacelle and the rotor, which may damage or destroy parts of the wind turbine.

SUMMARY

An aspect relates to an improved lightning protection system for a wind turbine as well as a wind turbine with such a lightning protection system.

Features and details discussed with respect to the inventive lightning protection system are also correlated with the inventive wind turbine and the other way around.

According to a first aspect of embodiments of the present invention, a lightning protection system is provided for a wind turbine. The lightning protection system comprises a connection unit to be placed between a nacelle and at least one blade of the wind turbine for conducting lightning current from the at least one blade to the nacelle. Specifically, the connection unit is configured to be arranged between the nacelle and the at least one blade in order to conduct lightning current and/or static energy from the at least one blade to the nacelle, in particular to an outer frame part of the nacelle. The connection unit comprises a first end portion with at least one nacelle contacting element, a second end portion with at least one blade contacting element, at least one first support member supporting the at least one nacelle contacting element, at least one second support member supporting the at least one blade contacting element, a base portion located between the first support member and the second support member, and at least one shifting element mechanically connecting the first support member and/or the second support member slidably relative to the base portion for amending a length of the connection unit in an amending direction from the blade to the nacelle.

By means of embodiments of the present invention, a gap between the nacelle and/or a gutter ring of the nacelle and the rotor blade can be bridged in a reliable and safe manner. That is, the gutter ring can be understood as a part of the nacelle. Thus, an electric arc between the nacelle and the blade can be prevented. This protects the corresponding parts of the wind turbine from damage and destruction. In other words, the wind turbine can be protected by means of the proposed lightning protection system conducting lightning current reliably from the blade to the nacelle of the wind turbine and from there to the ground.

Due to the stable electroconductive contact between the at least one blade and the nacelle by means of the connection unit, accumulated static energy that would be discharged in form of electromagnetic jumps or arcs, which would interfere with electrical cabinets damaging the signal, can be prevented.

A position between the nacelle and the at least one blade of the wind turbine shall not be considered restricted to a position directly between the nacelle and the at least one blade. The at least one blade contacting element can be configured to be brought in contact with a specific contact portion of the accompanying blade and the at least one nacelle contacting element can be configured to be brought in contact with a specific contact portion of or at the nacelle. The nacelle contacting element and/or the blade contacting element may each include more than one part.

The lightning protection system can be understood as a lightning conductor from the at least one blade to the nacelle. The nacelle contacting member and/or the blade contacting member can be made of an elastically deformable material in order to allow sufficient contact pressure with the nacelle and/or the blade without mechanically harming the same.

The at least one shifting element is configured to mechanically connect the first support member and/or the second support member slidably relative to the base portion so that a length of the connection unit in an amending direction from the blade to the nacelle can be adapted. Specifically, by moving the first support member and/or the second support member relatively to the base portion, the length of the connection unit can be adapted in the amending direction in order to be adapted to the length of a gap between the at least one blade and the nacelle.

The first support member and/or the second support member being arranged slidably relative to the base portion can be understood as the first support member and/or the second support member being arranged shiftable and/or moveable relative to the base portion in the amending direction.

The length of the connection unit may also be understood as a width of the connection unit. The amending direction may be a direction perpendicular to a length direction to the at least one blade towards the nacelle and/or the gutter ring and/or the other way around.

The base portion of an inventive lightning protection system is made of or essentially made of an electroconductive material. Specifically, the base portion may be made of or essentially made of copper. Thus, electric current can be transmitted reliably from the blade to the nacelle via the connection unit.

According to embodiments of the present invention it is possible that in a lightning protection system the at least one shifting element comprises at least one spring or is formed as at least one spring, in particular at least one coil spring. Such a spring can be provided in an easy and cheap manner. Coil springs are endurable and do not need diverse maintenance and/or service effort. In case of damage or destruction of the spring, it can be replaced easily. In case there are two springs mechanically connecting the first support member slidably relative to the base portion and/or two springs mechanically connecting the second support member slidably relative to the base portion, those two springs are arranged parallel to each other.

Further, the nacelle contacting element and/or the blade contacting element of an inventive lightning protection system can be rotatably supported on a shaft and may be wheel shaped. In this way, the nacelle contacting element may contact the nacelle while the connection unit is moving relative to the nacelle, without damaging the nacelle by scratching it, for example. This might be the case, when the connection unit is fixed to the at least one blade or a mounting portion for mounting the at least one blade. Further, the blade contacting element may contact the blade while the connection unit is moving relative to the blade, without damaging the nacelle by scratching it, for example. This might be the case, when the pitch of the blade is amended thus moving the blade relative to the connection unit, for example. In embodiments there are two blade contacting elements at the second end portion and/or two nacelle contacting elements at the first end portion. In further embodiments it is possible, that the nacelle contacting element and/or the blade contacting element comprise an electrically conductive part and an electrically insulating part, wherein the electrically insulating part is rotatably supported on the shaft and wheel shaped. In such an example, the electrically insulating part may be shaped in form of at least one, preferably two rubber wheels at each end portion, wherein the electrically conductive part is arranged next to the at least one rubber wheel and is provided to be pressed to the nacelle and the at least one blade, respectively, when the connection unit is placed in position, i.e., between the nacelle and the at least one blade.

According to embodiments of the present invention it is possible that, in a lightning protection system, the first support member and the second support member are arm shaped and positioned parallel to each other at least regarding a projected length direction of the same. By means of the assembly of the arm shaped support members parallel to each other, it is possible to easily position the end portions of the connection unit to a desired place at the nacelle and/or the at least one blade. An arm shaped support member can be understood as a support member that has a length that is considerably longer, for example at least three times longer, than its width and/or height.

Moreover, in a lightning protection system according to embodiments of the present invention, it is possible that at least one end portion of the at least one shifting element is fixed at the base portion, that at least one other end portion of the shifting element is fixed to the first support member and/or to the second support member, that the base portion comprises at least one guiding projection, and that the first support member and/or the second support member each comprise a guiding slot, in which the at least one guiding projection is slidably located. By combining the guiding projection in the base portion with the guiding slot in the first support member and/or the second support member, the relative movement between the base portion and the support members can be provided easily and reliably. A further advantage may be achieved, when a part of the base portion, where the at least one guiding projection is arranged, is provided as an adapter part of the base portion, which is detachably fixed as a separate part to a base part of the base portion. In this way, the connection unit can be arranged even more flexible in the gap between the nacelle and the at least one blade. The at least one adapter part may be screwed and/or bolted to the base part.

Furthermore, in advantageous embodiments of the present invention, the length of the at least one guiding projection in a moving direction of the first support member and/or a moving direction of the second support member is longer than the width in a direction perpendicular to the moving direction. Thus, the first support member and/or the second support member can be guided reliably into the desired moving direction. The moving direction can be understood as a direction from the nacelle to the at least one blade and/or the amending direction. The first support member and the second support member are arranged to be moved parallel to each other. The guiding slots may each have at least two times the length of the guiding projection. Thus, a sufficient relative movement between the at least one first support member and the base portion and/or the at least one second support member and the base portion can be provided.

In addition, an inventive lightning protection system can be configured such that the first support member and/or the second support member are U-shaped or essentially U-shaped, wherein part of the base portion, on which the shifting element is fixed, is located form fit between two legs of the U-shaped first support member and/or the U-shaped second support member. This brings further stability to the connection unit for the relative movement between the support members and the base portion. In addition, the transmission area can be increased. The first support member and/or the second support member may each comprise a first leg, a second leg, and a leg connector, wherein the first leg comprises a first guiding slot, the second leg comprises a second guiding slot and the base portion comprises a guiding portion arranged in the first guiding slot and a guiding projection arranged in the second guiding slot. In these embodiments, there are provided two shifting elements in the form of two coil springs for each support member, wherein the two shifting elements are positioned parallel to each other as well as parallel to the guiding slots and the guiding projections. The leg connector may be formed as a bearing for a shaft, on which at least part of the blade contacting element and/or the nacelle contacting element is arranged in the shape of a wheel, a rubber wheel.

According to a further aspect of embodiments of the present invention, a wind turbine is provided for generating electric power from wind energy, the wind turbine comprising a nacelle and blades, wherein at least one lightning protection system as described above is in contact with and between the nacelle and at least one of the blades. Therefore, the inventive wind turbine brings up the same advantages that have been discussed in detail with respect to the inventive lightning protection system according to the first aspect of embodiments of the invention.

In advantageous embodiments of the inventive wind turbine, the base portion is fixed at a blade mounting portion for mounting a blade to a rotor of the wind turbine. That is, the base portion is fixed to a part of the wind turbine where the blades are fixed. In these embodiments, the connection unit moves together with the blades, when the rotor is spinning. By mounting the base portion in this position, there is no need for a separate mounting part. That is, screws that will be necessary anyway for mounting the blades can be used to fix the base portion to the blade mounting portion. This leads to a simple and cheap solution.

Moreover, it is possible that the base portion of a wind turbine according to embodiments of the present invention is fixed at the blade mounting portion via an insulation member electrically insulating the base portion from the blade mounting portion. Thus, the lightning current can be conducted reliably from the at least one blade to the nacelle without striking into sensible parts inside the wind turbine. The blade mounting portion is arranged at a bearing for the at least one blade, while the base portion is fixed with bearing screws which are needed to hold the bearing in place anyway.

BRIEF DESCRIPTION

Some of the embodiments will be described in detail, with references to the following Figures, wherein like designations denote like members, wherein.

DETAILED DESCRIPTION

Figure 1:
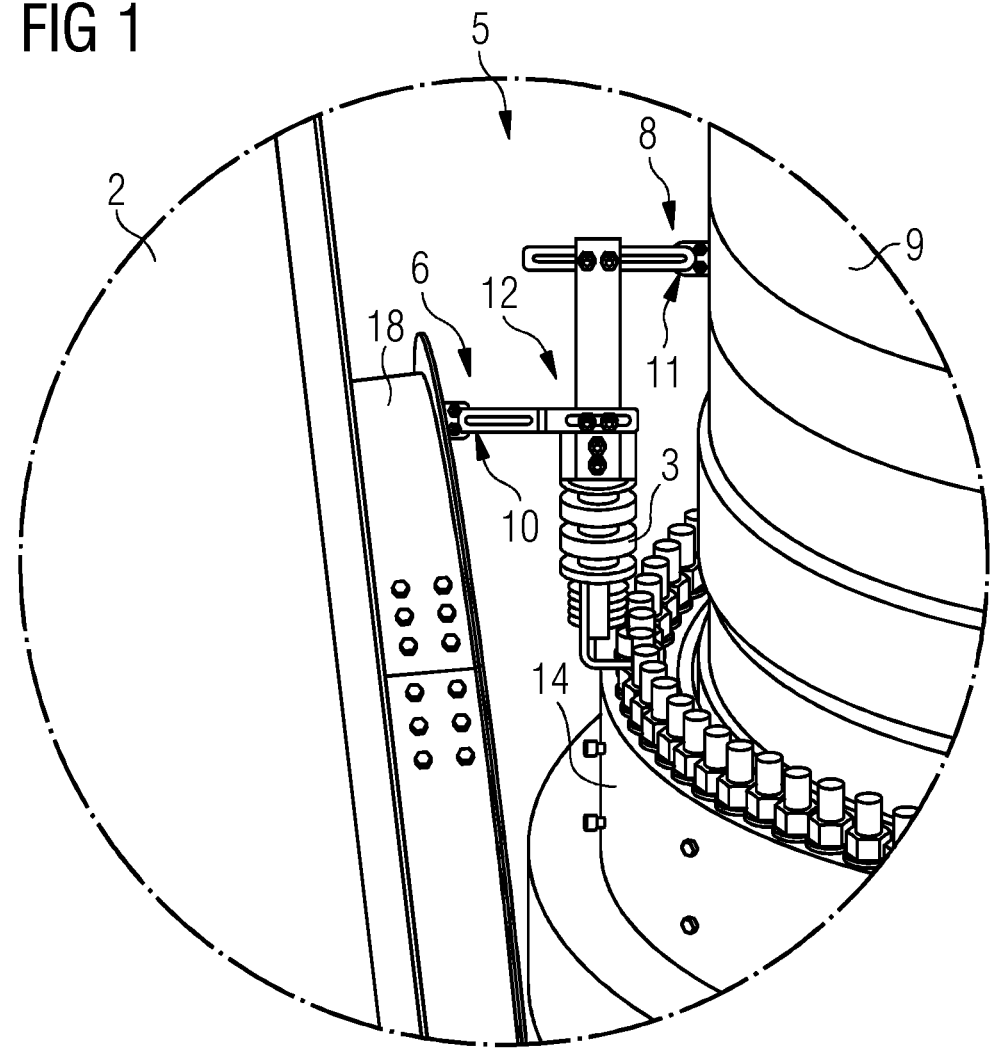
FIG. 1 shows a lightning protection system arranged in a wind turbine according to embodiments of the present invention.

FIG. 1 shows a lightning protection system 1 for a wind turbine 4 according to embodiments of the invention. The lightning protection system 1 comprises a connection unit 5 to be placed between a nacelle 2 and a blade 9 of the wind turbine 4 for conducting lightning current from that blade 9 to the nacelle 2. As can be seen in FIG. 1, the nacelle 2 comprises a gutter ring 18, which is contacted by the first end portion 6 and the nacelle contacting elements 7 of the first end portion 6, respectively. That is, according to embodiments of the present invention, the gutter ring 18 is part of the nacelle 2.

The connection unit 5 comprises a first end portion 6 with two nacelle contacting elements 7 and a second end portion 8 with two blade contacting elements 7, wherein the nacelle contacting elements 7 and the blade contacting elements 7 are each rotatably supported on a shaft (not shown) at the respective end portion and wheel shaped. Specifically, the contacting elements 7 are all made of rubber.

The connection unit further comprises a first support member 10 supporting the two nacelle contacting elements 7, a second support member 11 supporting the two blade contacting elements 7, and a base portion 12 located between the first support member 10 and the second support member 11. Moreover, there is provided a shifting element 13, shown in FIG. 2, configured to mechanically connect the first support member 10 slidably relative to the base portion 12 as well as a shifting element 13, shown in FIG. 2, configured to mechanically connect the second support member 11 slidably relative to the base portion 12. The shifting elements 13 are further configured and arranged to amend a length of the connection unit 5 in an amending direction from the blade 9 to the nacelle 2 in order to adjust the length of the connection unit 5 to different gap dimensions when wind turbine 4 is operated in a power generating condition.

As can be further seen in FIG. 1, the base portion 12 is fixed at a blade mounting portion 14 for mounting a blade 9 to a rotor of the wind turbine 4. Specifically, the base portion 12 is fixed at the blade mounting portion 14 via an insulation member 3 electrically insulating the base portion 12 from the blade mounting portion 14. The insulation member 3 is fixed via bearing screws to a bearing for that blade 9 and the blade mounting portion 14, respectively. As can be further drawn from FIG. 1, the first support member 10 and the second support member 11 are arm shaped and positioned parallel to each other regarding a projected length direction of the same.

Figure 2:
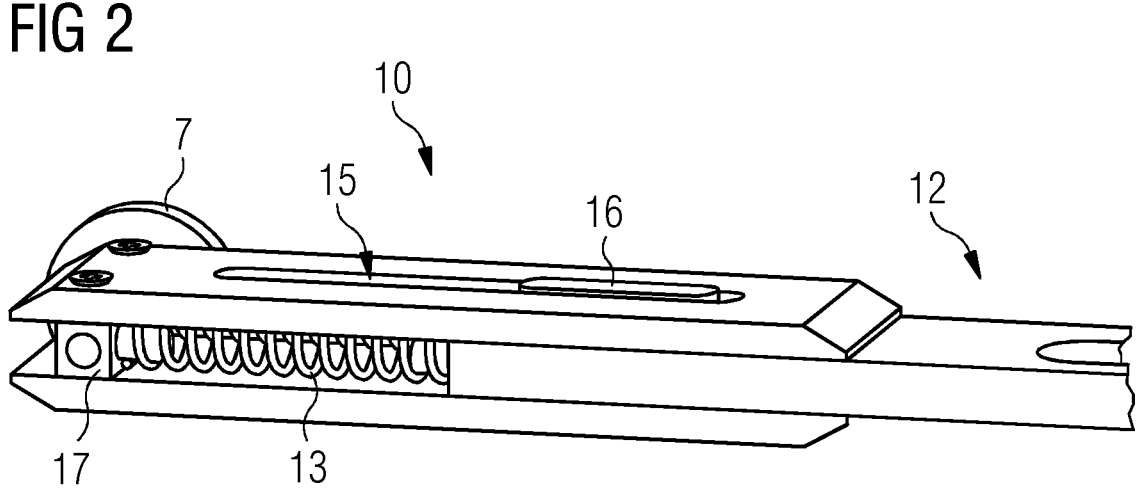
FIG. 2 shows a part view of the inventive lightning protection system shown in FIG. 1.

FIG. 2 shows a part view of the above described lightning protection system 1. As can be seen in FIG. 2 as well as in FIG. 1, the base portion 12 comprises an adapter part and/or adapter parts mounted to a core part of the base portion 12 as well as to the support members 10, 11. Specifically, the adapter part of the base portion 12 is connected to the support members 10, 11 via the shifting elements 13. As can be seen in FIG. 2, the shifting element 13 shown there comprises two coil springs, wherein one end of each coil spring is fixed to the base portion 12 and the other end is fixed to the respective first support member 10. Specifically, the coil springs are fixed to a bearing 17 of the first support member 10, wherein the first support member 10 is U-shaped by the bearing 17 and two leg portions. Part of the base portion 12, i.e., part of the adapter part, to which the shifting element 13 is fixed, is located form fit between those two legs of the first support member 10. Same applies to the second support member 11.

As further shown in FIG. 2, one end portion of the shifting element 13 is fixed at the base portion 12, the other end portion of the shifting element 13 is fixed to the first support member 10, wherein the base portion 12 comprises two guiding projections 16 (only one shown) and the first support member 10 comprises two guiding slots 15 (only one shown), in which the guiding projections are slidably located. Specifically, one guiding slot 15 is formed in each leg of the first support member 10. Same applies for the second support member 11. For a better understanding of the first support member 10 and the support members 10, 11 in general, one rubber wheel was left out in the example of FIG. 2. In addition, FIG. 2 shows an example in which the length of a guiding projection 16 in a moving direction of the first support member 10 is longer than the width in a direction perpendicular to the moving direction.

Figure 3:
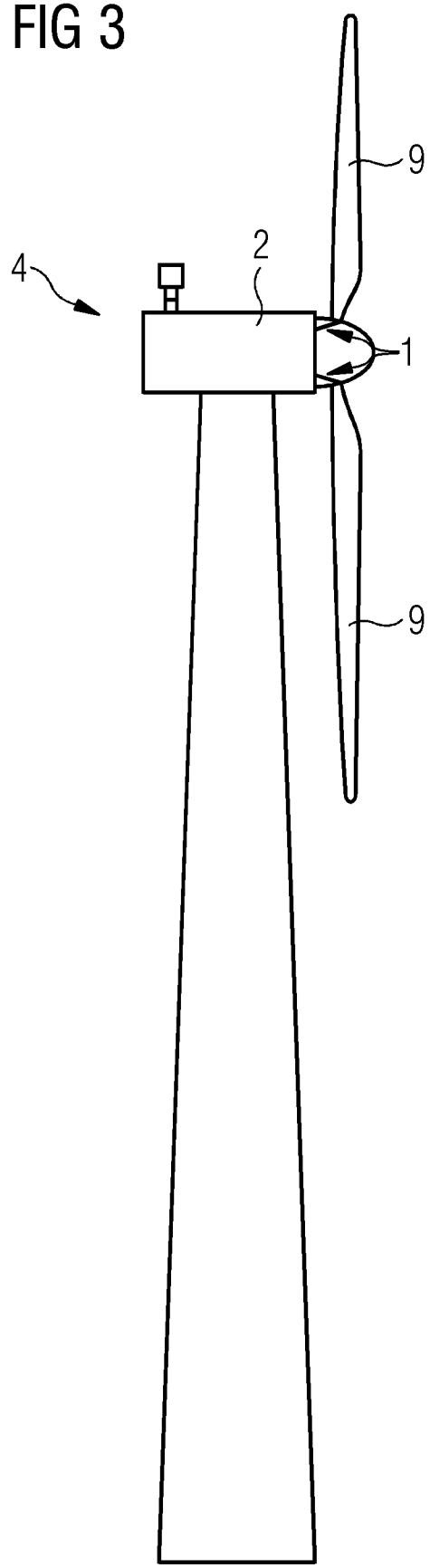
FIG. 3 shows a wind turbine with the inventive lightning protection system.

FIG. 3 shows a wind turbine 4 for generating electric power from wind energy, comprising a nacelle 2 and three blades 9, wherein a lightning protection system 1 as described above is in contact with and between the nacelle 2 and blades 9.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A lightning protection system for a wind turbine, comprising a connection unit to be placed between a nacelle and at least one blade of the wind turbine for conducting lightning current and/or static energy from the at least one blade to the nacelle, the connection unit comprising a first end portion with at least one nacelle contacting element, a second end portion with at least one blade contacting element, at least one first support member supporting the at least one nacelle contacting element, at least one second support member supporting the at least one blade contacting element, a base portion located between the first support member and the second support member, and at least one shifting element mechanically connecting the first support member and/or the second support member slidably relative to the base portion for amending a length of the connection unit in an amending direction from the at least one blade to the nacelle, wherein the base portion comprises an electro-conductive material and conducts the lightning current and/or static energy from the second end portion to the first end portion,
wherein at least one end portion of the at least one shifting element is fixed at the base portion, at least one other end portion of the at least one shifting element is fixed to the first support member and/or to the second support member, the base portion comprises at least one guiding projection, and the first support member and/or the second support member each comprise a guiding slot, in which the at least one guiding projection is slidably located.

2. The lightning protection system according to claim 1, wherein the at least one shifting element comprises a spring.

3. The lightning protection system according to claim 1, wherein the at least one nacelle contacting element and/or the at least one blade contacting element are rotatably supported on a shaft and are wheel shaped.

4. The lightning protection system according to claim 1, wherein the first support member and the second support member are arm shaped and positioned parallel to each other at least regarding a projected length direction of the same.

5. The lightning protection system according to claim 1, wherein a length of the at least one guiding projection in a moving direction of the first support member and/or the second support member is longer than a width of the at least one guiding projection in a direction perpendicular to the moving direction.

6. The lightning protection system according to claim 1, wherein the first support member and/or the second support member has a U-shaped form, wherein part of the base portion, on which the shifting element is fixed, is located form fit between two legs of the U-shaped form of the first support member and/or the U-shaped form of the second support member.

7. A wind turbine for generating electric power from wind energy, comprising a nacelle and blades, wherein at least one lightning protection system according to claim 1 is in contact with and between the nacelle and at least one of the blades.

8. The wind turbine according to claim 7, wherein the base portion is fixed at a blade mounting portion for mounting a blade to a rotor of the wind turbine.

9. The wind turbine according to claim 8, wherein the base portion is fixed at the blade mounting portion via an insulation member electrically insulating the base portion from the blade mounting portion.

* * * * *